United States Patent Office 3,426,011
Patented Feb. 4, 1969

3,426,011
CYCLODEXTRINS WITH ANIONIC PROPERTIES
Stanley M. Parmerter, Wheaton, Earle E. Allen, Jr., Chicago, and Glenn A. Hull, Oak Park, Ill., assignors to Corn Products Company, New York, N.Y., a corporation of Delaware
No Drawing. Filed Feb. 13, 1967, Ser. No. 615,331
U.S. Cl. 260—209       12 Claims
Int. Cl. C08b 19/00; C13l 1/10

ABSTRACT OF THE DISCLOSURE

This application describes cyclodextrin derivatives having ether substituents of the anionic type. These derivatives form anionic salts with many different cations. Also covered are methods for perparing the derivatives. The derivatives are useful in flocculation applications, in paper finishing, and as binders. They are also complexing or clathrating materials.

Specification

This invention relates to novel, useful derivatives of cyclodextrin and to methods of producing them. More particularly, this invention relates to derivatives of cyclodextrin that include ether substituents that impart anionic properties to the cyclodextrins. More precisely these cyclodextrin derivatives include substituents that introduce a negative electrical charge into the molecule.

The cyclodextrins are a group of homologous oligosaccharides that are obtained from starch by the action of enzymes elaborated by *Bacillus macerans*. The cyclodextrins are known as Schardinger dextrins from an early investigator who studied these materials. They are homologous cyclic molecules containing 6 or more α-D-glucopyranose units linked together at the 1,4 positions as in amylose. The cyclic molecule may also be referred to as a torus. As a consequence of the cyclic arrangement, this torus is characterized by having neither a reducing end group nor a non-reducing end group. The torus molecule is depicted in the following schematic formula, where the hydroxyl groups are shown in the 2, 3 and 6 positions in the illustrated anhydroglucose units. The letter $n$ may be a number from 4 to 6, or higher.

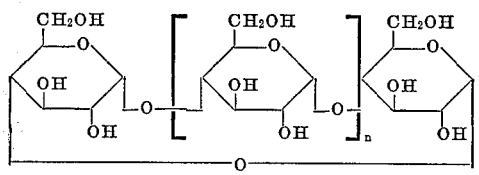

When $n$ is 4, the torus molecule is known as α-cyclodextrin or cyclohexaamylose, because the torus contains six anhydroglucose units; when $n$ is 5, the seven unit member is known as β-cyclodextrin or cycloheptaamylose; and when $n$ is 6, the eight unit member is known as γ-cyclodextrin or cycloctaamylose. When reference is made herein to "cyclodextrin," it is intended to include the foregoing forms as well as still other tori that have a still larger number of units in the molecule, and, as well, mixtures of these and other homologs.

Cyclodextrin is produced from starch by the action of an enzyme commonly known as cyclodextrin transglycosylase (*B. macerans* amylase). The source of the enzyme is usually a culture of *Bacillus macerans* which is grown under conventional conditions on conventional media containing sources of nitrogen, carbon, growth factors and minerals. The cyclodextrin transglycosylase may be produced by following published teachings such as, for example, those described by D. French in Methods in Enzymology, S. P. Colowick and N. O. Kaplan, editors, Academic Press, New York, N.Y., Vol. V, 1962, pp. 148–155.

The cyclodextrin transglycosylase activity in cultures of *Bacillus macerans* may be measured by the Tilden-Hudson procedure as described by these two workers in J. Bacteriol, 43, 527–544, 1942. In general, the cyclodextrin transglycosylase is added to a dilute solution of a gelatinized starch, whereupon a conversion to cyclodextrin occurs by enzymolysis. Procedures for making and isolating the cyclodextrins have been variously described as by F. Cramer and D. Steinle, Ann., 595, 81 (1955). If desired, the various homologs such as, for example, the alpha, beta, and gama, may be fractionated by procedures such as those described by D. French et al., J. Am. Chem. Soc., 71, 353 (1949).

The various homologous cyclodextrins, having from six to eight units, or higher, and their mixtures, may be used as equivalent materials for the purposes of this invention. In practice, there may be little reason for separating the various fractions, and the cyclodextrin employed may contain a preponderance of β-cyclodextrin, for example. No distinction is intended between the various homologous cyclodextrins or their mixtures unless otherwise indicated, when using the term "cyclodextrin."

Cyclodextrin is known as a clathrating compound, that is, it is adapted to form inclusion compounds. It is known to form a variety of crystalline complexes with many organic substances, particularly with organic liquids of low solubility in water. It is also known to form various complexes with neutral salts, halogens, and bases. In referring to the inclusion and clathrating properties, reference is often made to the torus molecule being a host molecule and the included or complexed molecule being the guest molecule. Cyclodextrin has established utility, and is the subject of study for further applications. It is understandably desirable to provide novel cyclodextrin structures to be used as inclusion compounds, and for other purposes.

It is one primary object of the invention to provide new cyclodextrin products, namely, cyclodextrin derivatives having ether substituents which impart anionic properties to the cyclodextrin.

It is another object of this invention to provide new cyclodextrin products which have ether substituents imparting anionic properties to the cyclodextrin, with said ether substituents being present in said cyclodextrin at various degrees of substitution.

Another object of this invention is to provide simple and practical methods for making the new cyclodextrin derivatives.

A more general object of the invention is to provide novel cyclodextrin derivatives that are formed from reagents that introduce anionic-type substituents into the molecule, over broad ranges of substitution. A related object of the invention is to provide novel, practical processes for making such derivatives.

Other objects of the invention will be apparent hereinafter from the specification and from the recitals of the appended claims.

In accordance with the invention we have discovered a new class of cyclodextrin derivatives which possess an anionic character. These cyclodextrin derivatives are generally formed by the reaction of cyclodextrin with a reagent that introduces an anionic-substituent into the molecule. That is, through such reaction the cyclodextrin has introduced into its structure a substituent possessing a negative electrical charge.

Preferred cyclodextrin derivatives of this invention may be represented by the following general formula:

cyclodextrin—O{R—Y]⁻[Me]⁺

In the foregoing general formula, R is an alkylene, hydroxy alkylene, halogeno alkylene, cycloalkylene, an aralkylene, or an otherwise substituted alkylene radical; Y represents any organic acid group such as, for example, substituted phosphoric, phosphonic, phosphinic, sulfonic, sulfinic, or carboxyl; and Me is an organic or a metallic cation such as, for example, sodium, calcium, potassium, magnesium, lithium, quaternary ammonium, hydrogen, and the like. Thus, R may be methylene, ethylene, propylene, etc. The foregoing and other alkylene radicals also may have substituted thereon in one or more places a hydroxy, alkyl or aryl radical, cycloalkylene radicals derived from, for example, cyclopropane, cyclobutane and higher homologues. R may also represent a phenylene radical and alkyl or halo substituted phenylene radicals.

The anionic or acid group have the effect of introducing into the cyclodextrin molecule a negative electrical charge. The presence of such a charge is frequently detectable by electrophoresis and by known dye staining techniques. However, these detection methods indicate net molecular electric charge rather than, necessarily, the charge introduced by any particular substituent. The net charge on a molecule of a cyclodextrin derivative of this invention is not necessarily negative. Rather, the molecule may exhibit a response to electrophoresis that is characteristic of either a positive, negative, amphorteric or neutral molecule. Nevertheless, the derivatives of this invention are referred to as anionic derivatives, as is customary in the art, or as derivatives that contain an anionic-type substituent.

As is known, the anhydroglucose unit may have different degrees of substitution (D.S.), from one to three. In a given quantity of a cyclodextrin derivative, there will generally be some cyclodextrin molecules that are not substituted at all (D.S., O), together with other molecules that have different degrees of substitution, from 1 to 3. A statistical average is employed to characterize the average D.S. of the entire quantity, although the figure is ordinarily stated as the D.S. rather than as the average D.S.

The present invention embraces derivatives of cyclodextrin (actually, reaction mixtures obtained from the derivatizing of cyclodextrin) whose D.S. is from a small but detectable amount, such as, for example, as little as 0.0001, up to the maximum level of three. This necessarily implies that the cyclodextrin derivatives may be recovered in the form of a mixture with other materials, such as unreacted cyclodextrin, and, as well, in substantially pure form. For example, if there were a single substituent in a single anhydroglucose unit of cyclohexaamylose, the D.S. of the cyclohexaamylose derivative would be 0.167. Since some of the derivatives obtained by the present invention have D.S. values below 0.167, there must be unsubstituted molecules present.

According to present beliefs in the art, the 6 position hydroxyl in any anhydroglucose unit is the most reactive. Further, the hydroxyl at the 2 position is believed to be the next reactive, and the hydroxyl at the 3 position is believed to be the least reactive. The present belief of the art further suppress that the 6 position hydroxyl in the anhydroglucose unit will undergo a more extensive substitution or addition than the hydroxyls at the 2 and 3 positions, respectively, but it may be otherwise. Irrespective to the actual sequence or order of reactions or the number of anhydroglucose units involved, the general formula is intended to represent the products of this invention wherein the ether substitution may occur in different degrees of substitution at all or less than all anhydroglucose units in the cyclodextrin.

The cyclodextrin derivatives of this invention are generally prepared by reacting cyclodextrin under alkaline conditions with a reagent that introduces an anionic-type substituent into the cyclodextrin molecule. Representative derivatives, so produced, would include, for example, such ethers as the alkyl sulfonic ethers; aralkyl sulfonic ethers; alkyl carboxy ethers; aralkyl carboxy ethers; phosphonic ethers; phosphinic ethers; sulfinic ethers, and the like.

Ordinarily, the material that is reacted with an anionic reagent, in accordance with this invention, will be cyclodextrin either in the form of an homologous mixture of cycloamyloses, or in the form a substantially pure homolog such as, for example, β-cylodextrin. However, it is also contemplated that the cyclodextrin may be initially partially derivatized or cross-linked. For example, the cyclodextrin could be phosphorylated so as to be crosslinked and already "anionic" in nature.

In order to prepare cyclodextrin derivatives that contain a sulfonic group as the anionic-type substituent, cyclodextrin is reacted with a sultone reactant, for example. Such a reactant may be represented as follows:

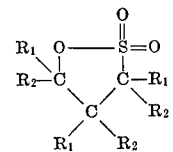

where $R_1$ and $R_2$ may be the same or different, and are hydrogen or alkyl. For example, where $R_1$ and $R_2$ are hydrogen, the resulting propane sultone is reacted with the cyclodextrin to form the sulfopropyl ether derivative.

The sulfonic alkyl ethers may also be obtained by reacting a halogeno alkyl sulfonate, such as, for example, sodium 2-chloroethane sulfonate with the cyclodextrin. This may be represented by:

$ClCH_2CH_2SO_3^-Na^+ + cyclodextrin-OH \rightarrow$
$\qquad\qquad cyclodextrin-OCH_2CH_2SO_3^-Na^+$ The carboxy alkyl anionic derivatives may be obtained, for example, by reacting cyclodextrin with a halogen alkyl carboxylic acid such as chloracetic acid; with a lactone such as β-propiolactone; and with an ethylenically unsaturated amide such as acrylamide, methacrylamide, etc. followed by the step of hydrolyzing the resulting amide group such as the propionamide group. The carboxy alkyl ether products may also be obtained by reacting cyclodextrin with an ethylenically unsaturated nitrile such as acrylonitrile, to obtain the cyanoethylated product, and then hydrolyzing this product to obtain the carboxy ethyl ether.

The use of the sodium salt of chloracetic acid as a reactant is represented as follows:

$ClCH_2COONa + cyclodextrin-OH \xrightarrow{alkali}$
$\qquad\qquad cyclodextrin-O-CH_2COO-Na^+$ The use of β-propiolactone as a reactant is represented by the reaction:

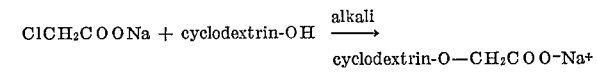

$\qquad\qquad cyclodextrin-O-CH_2CH_2COO-H^+$

The use of acrylamide as a reactant is represented by the reaction:

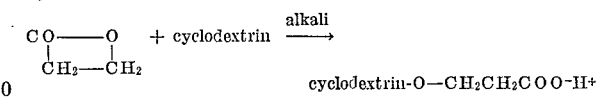

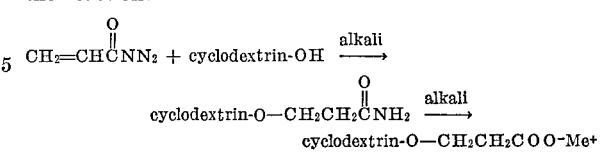

$\qquad\qquad cyclodextrin-O-CH_2CH_2COO-Me^+$

The use of acrylonitrile as a reactant is represented by the reaction:

$CH_2=CHCN + cyclodextrin-OH \rightarrow$
$\qquad cycloxdextrin-O-CH_2CH_2CN \xrightarrow{alkali}$
$\qquad\qquad cyclodextrin-O-CH_2CH_2COO-Me^+$ Reactions of cyclodextrin with the foregoing reactants are conducted in the presence of an alkaline catalyst and, following substantial completion of the reaction, the medium is generally neutralized and the product is separated as a precipitate by treatment with solvents such as alcohol and acetone. The use of an alkali metal hydroxide, such as sodium hydroxide, provides sodium as the cation for the cyclodextrin ether anion derivative.

Other conventional steps may be practiced in the process to facilitate the separation and recovery of the cyclodextrin anionic ethers. These may include neutralizing the basic catalyst and stripping the volatiles under reduced pressure before or after filtration.

The following examples are now presented to teach some embodiments of practicing the invention, but it should be understood that such teachings are only representative and in no sense should they be considered as being exclusive teachings. All parts and percentages are by weight unless expressly stated to be otherwise.

EXAMPLE 1

Sulfopropyl ether of $\beta$-cyclodextrin $\beta$-Cyclodextrin in an amount of about 45 grams was slurried in 90 ml. of 50% NaOH. To the slurry was added, portionwise, with stirring, 54.6 grams of propane sultone. The reaction was exothermic and was allowed to continue overnight (18 hours) at 50° C.

Following this reaction period, 150 ml. of water was added to the mixture, and the mixture was then neutralized to pH 5.5. The mixture was then transferred into 3 liters of ethanol with very rapid stirring. The precipitated product was separated by filtration, and then stirred vigorously with 1 liter of methanol, filtered, and separated. The dissolution and separation process was repeated twice, and the product was finally dried in a vacuum oven overnight.

Analysis showed the product to contain 4.56% S, which corresponds to a D.S. of 0.27.

EXAMPLE 2

More sulfopropyl ethers of $\beta$-cyclodextrin

The process steps of Example 1 were followed to obtain products having different degrees of substitution. Different amounts of the reactants were used as shown in the following table.

| Run | Starting material, grams | | Product analysis | |
|---|---|---|---|---|
| | $\beta$-Cyclodextrin | Propanesultone | % S | D.S. |
| A | 113.5 | 136 | 5.92 | 0.35 |
| B | 57 | 47 | 6.5 | 0.46 |
| C | 57 | 142 | 9.88 | 0.90 |
| D | 28 | 85 | 13.1 | 1.6 |

EXAMPLE 3

Sulfoethyl ether of $\beta$-cyclodextrin

A mixture was made, with stirring, of 28 grams of sodium 2-chloroethanesulfonate, 35 ml. of toluene, 14 ml. of pyridine at 10° C., and 28 grams of $\beta$-cyclodextrin. The mixture was heated under reflux at 100° C. for 4 hours. The resulting solid was then collected and washed successively wtih benzene, acetone and methanol.

The yield of the product melting at 240°–244° C. was 28 grams. The product contained 4.35% of S, which corresponds to a D.S. of 0.35.

EXAMPLE 4

Sulfopropyl ether of $\alpha$-cyclodextrin $\alpha$-Cyclodextrin was added in an amount of 9.7 grams to a solution of 6 grams of sodium hydroxide in 25 ml. of water. To this mixture was added 35 grams of propanesultone with stirring, and the stirring was continued at 50° C. for 16 hours. The mixture was then allowed to stand at room temperature for an additional 34 hours. The pH was adjusted from 2.0 to 6.0 by addition of 2 N sodium hydroxide solution, followed by dilution with 2.5 liters of methanol. To the clear yellow solution was added 1.5 liters of acetone.

The solid precipitate was collected, and a second crop of product was then obtained by evaporation and washed with three 300 ml. portions of hot ethanol. The combined crops were washed with 200 ml. of hot methanol, and the yield of the light tan product was 12 grams.

The product contained 9.1% S, which corresponds to a D.S. of 0.80.

EXAMPLE 5

Solubility determination

The product obtained according to Example 1 and $\beta$-cyclodextrin were compared relative to water solubility. Saturated solutions of each compound were obtained using excess solid in flasks of water, and frequently shaking the flasks over a seven day period. An aliquot of the liquid phase was removed from each flask with a pipette which had an attached inlet stoppered with glass wool to prevent entry of any solid. The aliquots were placed in a vacuum oven and held therein at 60° C., for two days. The dried products were weighed until a constant weight was obtained. The solubility results were determined to be as follows:

| Compound: | Solubility grams/100 ml. |
|---|---|
| $\beta$-Cyclodextrin | 1.48 |
| Sulfopropyl ether of $\beta$-cyclodextrin (Ex. 1) | 54.0 |

EXAMPLE 6

Carboxymethyl ether of $\beta$-cyclodextrin

A suspension of 50 grams of $\beta$-cyclodextrin in 200 ml. of 2-propanol was stirred vigorously while 100 ml. of 30% aqueous NaOH was added. The mixture was stirred for 30 minutes, and then 18 grams of sodium chloroacetate was added over a period of 30 minutes. The mixture was stirred overnight at 55° C. The mixture, following substantial completion of the reaction, was neutralized with concentrated HCl to pH 7.0, after which 2–3 liters of methanol was added. The precipitated product was separated by filtration. The suspension and separation step was repeated three times, and the product was dried.

Analysis showed the reaction product to contain 1.78% of carboxyl, corresponding to a D.S. of 0.066.

EXAMPLE 7

Carboxyethyl ether of $\beta$-cyclodextrin

A mixture of 57 grams of $\beta$-cyclodextrin and 51 grams of $\beta$-propiolactone was heated at 80° C. for 4 hours. After cooling, the mixture was poured into 600 ml. of acetone, whereupon a white precipitate was formed. The solid precipitate was collected, washed with 1 liter of acetone, and dried at 70° C., to yield 55 grams of product.

Crystallization from 200 ml. of hot water gave 22.9 of crystalline solid products melting at 268°–274° C. with decomposition. Analysis showed 1.21% of carboxyl, which corresponds to a D.S. of 0.045. A sample of the product showed absorption under infrared analysis at 1690 cm.$^{-1}$, which is characteristic of the carboxyl group.

EXAMPLE 8

Hydrolysis of $\beta$-cyclodextrin propionamide

A slurry was made of 100 ml. of water and 57 grams of 0.25 D.S. $\beta$-cyclodextrin propionamide. To the slurry was added a solution of 16 grams of sodium hydroxide in 100 ml. of water. The mixture was stirred under reflux at 100° for 24 hours. The resulting brown solution was acidified to pH 6.5 with concentrated hydrochloric acid and a white solid was separated. The filtrate was diluted with methanol to yield a second crop of the product.

The analysis showed 5.0% carboxyl, which corresponds to a D.S. of 0.20.

Similar results have been obtained by derivatizing mixtures of homologous cyclodextrins, and particularly such a mixture containing about 90% of β-cyclodextrin. Moreover, in addition to the anionic derivatives mentioned above in the examples, many other derivatives are easily prepared in accordance with this invention. Also, the derivatives of this invention may be further derivatized, if desired, with other and different substitutents, to produce molecules having desired properties.

Among the organic acid radicals that can be etherified with cyclodextrin, using the chemical techniques mentioned previously, the following are useful in the formation of derivatives with interesting properties, in addition to those previously identified either generally or specifically. They are identified, for convenience, in the acid form, unreacted with cyclodextrin:

epoxycarboxylic acid
α-halocarboxylic acid
alkanephosphorous acid—$RP(OH)_2$
dialkylphosphinous acid—$R_2POH$
alkanephosphonic acid—$RPO_3H_2$
dialkylphosphinic acid—$R_2PO_2H$
alkanethiophosphonic acid—$RPS(OH)_2$
dialkylthiophosphinic acid—$R_2PS(OH)$
alkylsulfonic acid—$RSO_3H$ The alkyl group represented by R above may be methyl, ethyl, n-propyl, i-propyl, butyl, heptyl, hexyl, hexadecyl, hendecyl, dodecyl, etc. Generally, the corresponding aryl, cycloalkyl, and cycloheteryl acid radicals may also be etherified, in addition to the alkyl compounds referred to above.

These new cyclodextrin derivatives may be used in association with cationic flocculating agents. These anionic derivatives impart an anionic property to colloids which may then be settled by the flocculating agents. In particular, the cyclodextrin derivatives with the anionic substituents may be adsorbed on sewage particles, or such sewage particles may be occluded with the cyclodextrin derivatives to facilitate settling by conventional cationic flocculating agents.

The anionic cyclodextrin derivatives are also useful when incorporated into tobacco or tobacco filters such as cigarette and cigar filters, whether or not these filters are an integral part of the cigarette or cigar itself. In such use the derivatives help to trap tars, undesirable flavors and the like. The derivatives of the present invention are also particularly useful as surfactants. They have particular utility as surface active agents when the molecule contains one or more long chain fatty groups. A preferred surfactant is prepared by alkoxylating the cyclodextrin with 1-50 moles of alkoxylating agent such as theylene oxide, propylene oxide and the like, followed by introduction of an anionic substitutent by reaction of the terminal hydroxide group by one or more of the same reactions as set forth above.

A particular utility and advantage of the cyclodextrin anionic ethers arises from the increase of solubility of cyclodextrin derivatives with the anionic substitutents as compraed to cyclodextrin per se. For example, the solubility of cyclodextrin may be increased in the range of 40-fold or more by derivatizing the cyclodextrin with an anionic-type substitutent to even a very low degree of substitution, such as, for example, a D.S. substantially less than one. Such increased solubility is advantageous for many uses, including the use of the cyclodextrin derivatives to form inclusion compounds. The anionic ethers of this invention also are useful in the paper art as binders in sizing and coating compositions.

While the invention has been described in connection with specific embodiments thereof, it will be understood that it is capable of further modification, and this application is intended to cover any variations, uses, or adaptations of the invention following, in general, the principles of the invention and including such departures from the present disclosures as come within known or customary practice in the art to which the invention pertains and as may be applied to the essential features hereinbefore set forth, and as fall within the scope of the invention and the limits of the appended claims.

What is claimed is:

1. A cyclodextrin derivative represented by the following formula:

cyclodextrin—[—O—R—Y]⁻[Me]⁺ where R is from the class consisting of alkylene, hydroxyalkylene, halogeno alkylene, cycloalkylene or aralkylene; Y is an acid group, and Me is a cation.

2. A cyclodextrin derivative as in claim 1 wherein the salt is represented by the following formula, cyclodextrin—[—O—R—Coo]⁻[Me]⁺ where R is an alkylene radical.

3. A cyclodextrin derivative as in claim 1 wherein the salt is represented by the following formula, cyclodextrin—[—O—R—SO₃]⁻[Me]⁺ where R is an alkylene radical.

4. A cyclodextrin derivative as in claim 1 wherein the salt is represented by the following formula, cyclodextrin—[—O—R—Y]⁻[Me]⁺ where R is an alkylene radical and the D.S. of said product ranges from a small but detectable amount up to about 3.

5. A cyclodextrin derivative as in claim 1 wherein the cyclodextrin contains predominantly from 6 to 8 anhydroglucose units.

6. A cyclodextrin derivative as in claim 1 wherein the cyclodextrin contains predominantly 7 anhydroglucose units.

7. The sulfoalkyl ethers of cyclodextrin.
8. The sulfopropyl ethers of cyclodextrin.
9. The sulfoethyl ethers of cyclodextrin.
10. The carboxyalkyl ethers of cyclodextrin.
11. The carboxymethyl ethers of cyclodextrin.
12. The carboxyethyl ethers of cyclodextrin.

References Cited

UNITED STATES PATENTS 3,046,272  7/1962  Strating et al. _____ 260—209
3,103,507  9/1963  Knoevenagel _____ 260—209
3,222,358  12/1965 Touey et al. _____ 260—209
3,346,555  10/1967 Nordgren _____ 260—209

LEWIS GOTTS, *Primary Examiner.*

JOHNNIE R. BROWN, *Assistant Examiner.*

U.S. Cl. X.R.

260—233.3; 252—351; 210—54; 131—9, 17; 162—175

UNITED STATES PATENT OFFICE
CERTIFICATE OF CORRECTION

Patent No. 3,426,011                                              February 4, 1969

Stanley M. Parmerter et al.

It is certified that error appears in the above identified patent and that said Letters Patent are hereby corrected as shown below:

Column 1, line 17, "perparing" should read -- preparing --. Column 2, line 7, "gama" should read -- gamma --. Column 3, line 31, "amphorteric" should read -- amphoteric --; line 63, "next reactive" should read -- next most reactive --; line 65, "suppress" should read -- suppose --; line 69, "to" should read -- of --. Column 4, line 11, "form a" should read -- form of a --; line 14, "$CH_2=CHCNN_2$" should read -- $CH_2=CHCNH_2$ --. Column 5, line 64, "4.35%" should read -- 5.34% --. Column 7, line 52, "theylene" should read -- ethylene --; line 59, "compraed" should read -- compared --. Column 8, line 25, "Coo" should read -- COO --.

Signed and sealed this 24th day of March 1970.

(SEAL)

Attest:

Edward M. Fletcher, Jr.                    WILLIAM E. SCHUYLER, JR.
Attesting Officer                               Commissioner of Patents